United States Patent [19]

Suttle

[11] Patent Number: 5,522,176
[45] Date of Patent: Jun. 4, 1996

[54] LANDSCAPING GROUND COVER

[76] Inventor: Gene C. Suttle, 50 Silver Lake Dr., Cropwell, Ala. 35054

[21] Appl. No.: 390,693

[22] Filed: Feb. 17, 1995

[51] Int. Cl.$^6$ ................................................ A01G 17/00
[52] U.S. Cl. .................................................................. 47/25
[58] Field of Search ............................... 47/25, 25 R, 95

[56] References Cited

U.S. PATENT DOCUMENTS

| | | | |
|---|---|---|---|
| 2,822,644 | 2/1958 | Berger | 47/25 R |
| 3,857,195 | 12/1974 | Johnson . | |
| 3,940,884 | 3/1976 | Mason, Jr. | 47/25 R |
| 4,648,203 | 3/1987 | Worzek | 47/25 R |
| 5,085,001 | 2/1992 | Crawley | 47/25 |
| 5,184,421 | 2/1993 | Meharg . | |
| 5,323,557 | 6/1994 | Sonntag . | |
| 5,355,623 | 10/1994 | Brown | 47/25 |
| 5,396,731 | 3/1995 | Byrne | 47/25 |

FOREIGN PATENT DOCUMENTS 2518441  11/1976  Germany ....................... 47/25 R
1378663  12/1974  United Kingdom ............ 47/25 R Primary Examiner—Henry E. Raduazo
Assistant Examiner—Joanne C. Downs
Attorney, Agent, or Firm—Hopkins & Thomas

[57] ABSTRACT

A landscaping ground cover to be placed around a base of an object such as a tree or shrub to prevent the growth of grass, weeds or other foliage and to protect the tree or shrub. The landscaping ground cover (10) comprises a sheet of flexible material, preferably having uniform thickness, and a plurality of concentric circular paths (18) defined along an upper surface. The circular paths (18) comprise channels (30) recessed into said upper surface. A perimeter path (28) extends from the innermost circular path (18) to the perimeter (26) of the ground cover. In addition, perimeter paths (14) provide means for altering the shape of the ground cover (10) for corner designs, square designs or to accommodate other unique landscaping needs. A plurality of drainage holes (32) are defined through said ground cover (10) which allow water and air to pass to the root system disposed below the ground cover (10).

7 Claims, 2 Drawing Sheets

LANDSCAPING GROUND COVER

FIELD OF THE INVENTION

The present invention relates generally to ground covers, and more particularly to a landscaping ground cover which prevents the growth of grass, weeds or other foliage in the area immediately adjacent to any object, such as a tree, shrub or upright post.

BACKGROUND OF THE INVENTION

In recent years, businesses have spent an increasing amount of effort toward improving the aesthetic appeal of their work places, including the landscaping of their office buildings or complexes. Commercial landscaping also has become critical in the increasingly competitive commercial real estate market. The home improvement industry also has recently experienced rapid growth, especially in the area of landscaping.

Presently, ground covers of varying designs are used to prevent the growth of grass, weeds or other foliage within a specified area. Ground covers are particularly popular tool in landscaping, whereby a ground cover is configured around a tree, shrub or post to prevent the undesirable growth of grass, weeds or other foliage in the area surrounding the object. This eliminates the awkward and time consuming task of mowing and edging around the object, and moreover, decreases the likelihood of damage to the tree or bush caused by the mower or trimmer. A ground cover also enhances the appearance to a lawn or landscape by providing more manicured features.

An example of a ground cover for inhibiting the growth of grass or weeds around the base of a tree is the device disclosed in U.S. Pat. No. 5,085,001. The device disclosed in U.S. Pat. No. 5,085,001 provides a central opening and a plurality of concentric perforated circles about that opening for accommodating tree trunks of varying size. A radial slit is provided from the central opening to the edge of the cover so that the cover may be placed around an existing tree. The ground cover is secured by a stabilizer ring and/or anchor hooks provided at the edge of the cover. The ground cover, however, is circular and could not be used readily on closely spaced trees, shrubs or post because the ground covers would overlap, making it difficult to adequately secure the overlapping portions of the adjacent ground covers.

U.S. Pat. No. 5,323,557 also describes a ground cover having a central opening and a plurality of scored concentric circles about the central opening for accommodating different size tree trunks. A radial slit extending from the central opening to the perimeter of the ground cover allows the ground cover to be placed around existing objects. The ground cover disclosed in U.S. Pat. No. 5,323,557 is circular, and comprises a multi-layer design having a central portion of one thickness, an intermediate portion of greater thickness than the central portion, and an outer portion which is tapered toward the perimeter of the ground cover. This ground cover is represented to reflect an advancement by providing a plurality of drainage holes which allow water and air to pass to the roots of the trees below the ground cover. The circular design, however, prohibits this ground cover from being positioned in a landscaping arrangement where the tree, shrub or post is confined by a corner or square design such as a tree or shrub positioned in a square opening along a concrete sidewalk. The multi-layer configuration in conjunction with the circular design likewise prohibits these ground covers from being used with closely spaced adjacent objects where the covers would overlap.

An example of a ground cover in a square configuration is disclosed in U.S. Pat. No. 4,648,203. The ground cover disclosed in U.S. Pat. No. 4,648,203 provides a central opening through which a tree trunk upwardly extends, surrounded by a plurality of semicircular slits forming flaps which can be removed to accommodate any increase in the size of the tree trunk. While this device is intended to protect the trunk of the tree from damage by lawn care devices by providing a barrier wall around the central opening and flaps, the barrier wall inherently limits how close adjacent trees, shrubs or posts could be positioned. In addition, the barrier wall is manufactured in a specific configuration, such as square or circle, and is not capable of being custom-fitted on site for a particular landscaping feature or shape.

While some of the known landscaping cover provides indicia or other guide markings which enable the user to trim the cover to a desired configuration, none of the known covers provide an integrally molded guide for the user's utility knife or other cutting mean to ensure that the trimming of the cover is done to exact specifications. Further, none of the known covers provide means for customizing the shape of the cover to accommodate particular landscaping features.

Thus, it would be desirable to have a landscaping ground cover which is light weight, inexpensive to manufacture, sizable to fit various size trees, shrubs or posts, and capable of being customized to a particular shape.

SUMMARY OF THE INVENTION

Briefly described, in its preferred embodiment the present invention is a landscaping ground cover for positioning around a tree, shrub, post or other object, and comprising a circular sheet of flexible material defining a plurality of concentric circular indentations or paths located on the tipper surface of the sheet which can be selectively cut along to create a central opening. A radial indentation or path also is defined in the upper surface. This radial path extends from the innermost circular path to the perimeter of the sheet, for indicating a path which can be cut along to create a slit for enabling the cover to be placed around the bottom of the tree, shrub or post. The present invention also includes at least one perimeter path for indicating a path which can be cut along to customize the shape of the ground cover. A plurality of drainage holes are defined through the sheet for allowing water and air to pass through the sheet to the surface underneath the sheet.

The present invention comprises a novel method for customizing a ground cover, which comprises: sizing the tree, shrub or post around which said ground cover is to be used; cutting along a radial path from the perimeter of the ground cover to the center of the ground cover; cutting along one of several concentric paths so as to create a central opening in said ground cover; cutting along a perimeter path so as to customize the shape of the ground cover; and placing the cover on the ground around the bottom of a tree, shrub or post.

It is an object of the present invention is to provide a ground cover which will prevent the growth of grass, weeds or other foliage in the area immediately adjacent a tree, shrub or post, in an environmentally safe manner without inhibiting the growth of the tree or shrub.

Another object of the present invention is to provide a ground cover which is adaptable to fit around trees, shrubs, posts or any other upwardly extending objects having various diameters.

Another object of the present invention is to provide a ground cover which is adaptable for use in a circular or multi-sided configuration.

Another object of the present invention is to provide a ground cover capable of protecting a tree or shrub from damage attributable to lawn maintenance machines such as lawn mowers and edgers.

Another object of the present invention is to provide a ground cover which will protect a tree or shrub from damage attributable to freezing weather.

Another object of the present invention is to provide a ground cover which is aesthetically pleasing, inexpensive to manufacture, durable in structure, and capable of being installed quickly and easily.

Another object of the present invention is to provide a ground cover which includes an integrally molded guide means for guiding a knife or blade cutting the ground cover, so that the ground cover is trimmed to intended dimensions.

Other objects, features and advantages of the present invention will become readily apparent to one of skill in the art from the following description when considered in conjunction with the accompanying drawings.

DETAILED DESCRIPTION OF THE PREFERRED EMBODIMENT

Figure 1:
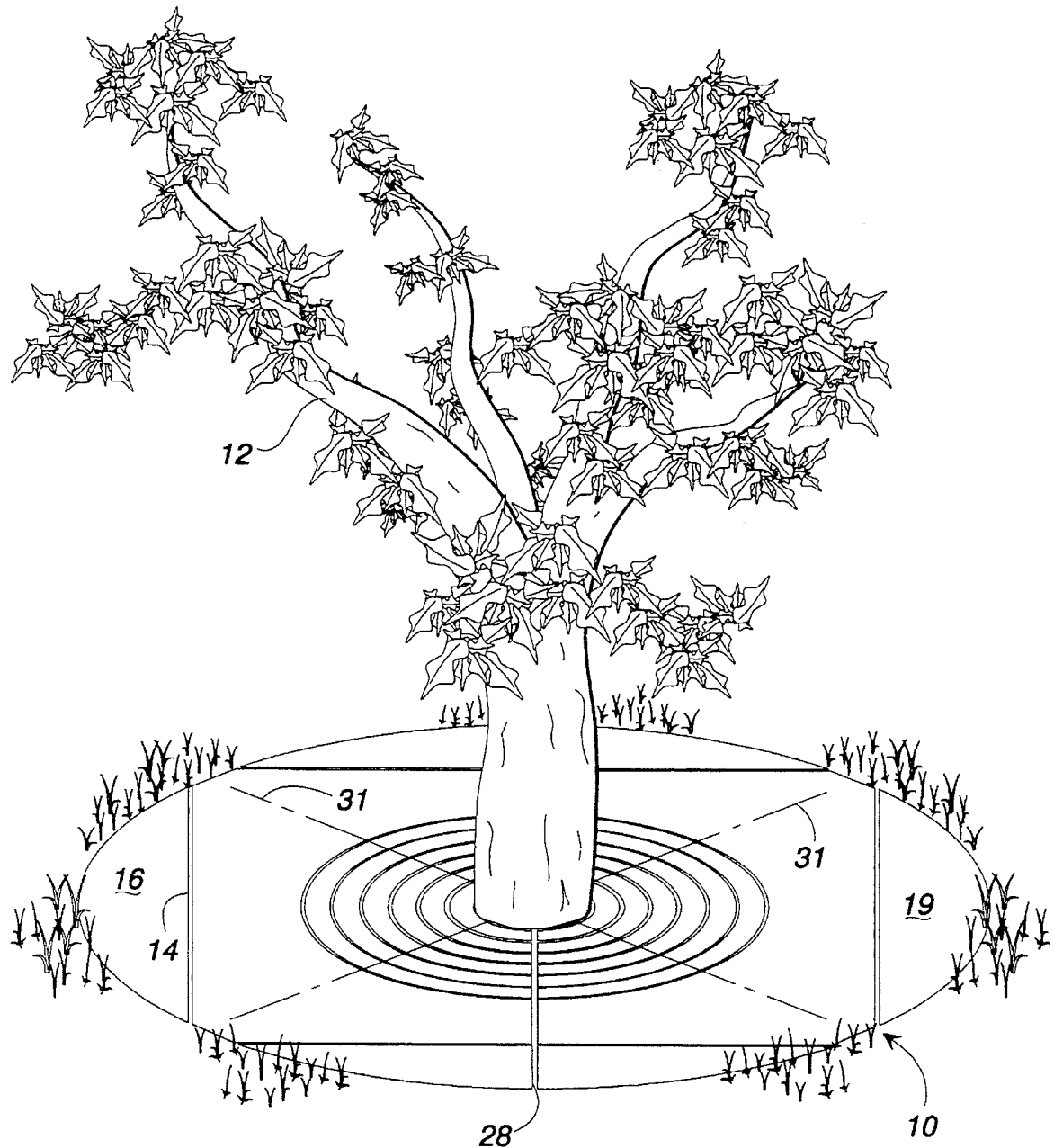
FIG. 1 is a perspective view of the landscaping ground cover of the present invention as used around a tree.

Referring now in detail to the embodiments chosen for illustrating the present invention, FIG. 1 illustrates a perspective view of a landscaping ground cover 10 as used with a tree 12. The ground cover 10 is placed around the trunk of the tree at its base so that the ground surrounding the tree is completely covered by ground cover 10. This prevents the growth of grass, weeds or other foliage in the area immediately adjacent the tree. Though the present invention is illustrated in use with a tree, it can be appreciated that the present invention can also be used with shrubs, posts or any other objects protruding or extending upwardly from the ground.

Figure 2:
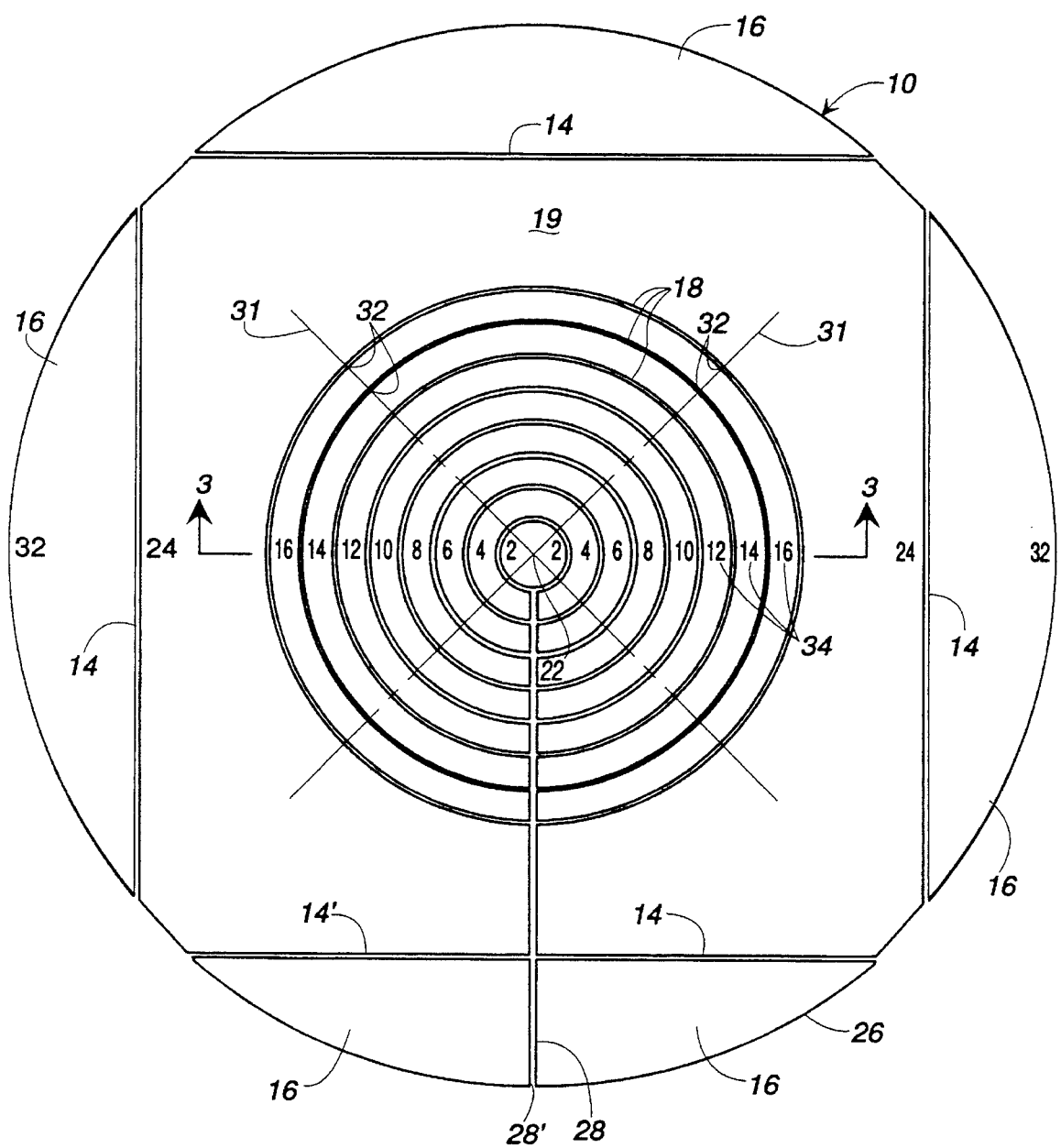
FIG. 2 is a top plan view of the landscaping ground cover of the present invention.

FIG. 2 shows the ground cover 10 prior to its being customized for use with a particular tree, shrub or post. The ground cover 10 is a substantially flat sheet of material having a substantially uniform thickness, and preferably constructed out of rubber, vinyl or another similar material which is lightweight and flexible. For purposes of illustrating the preferred embodiment, ground cover 10 is constructed out of a ¼ inch thick sheet of rubber molded to be circular, although other dimensions and shapes will suffice. For instance, the ground cover can be constructed out of a vinyl sheet having a thickness of approximately 1/32 inches. Formed concentrically about the center 22 of ground cover 10, is a plurality of circular indentations or paths 18 in the upper surface 19 of cover 10. The circular paths 18 are configured to define variously sized central portions which are to be removed from ground cover 10 so as to accommodate trees, shrubs or post of various sizes. In the preferred embodiment, the circular paths 18 begin with an innermost circular path 2 inches in diameter and progressively increase in increments of 2 inches up to an outermost circular path 16 inches in diameter. Raised reference numerals 34 formed in the upper surface 19 indicating the diameter of the circular paths 18 are provided adjacent each circular cutting path 18 for sizing and identifying each circular path 18.

Radially extending from the innermost circular path 18 to the perimeter 26 of ground cover 10 is a radial path 28. The circumference or perimeter 26 of ground cover 10 is circular although a plurality of perimeter paths 14 at right angles are provided so that ground cover 10 can be custom shaped by selectively cutting along perimeter paths 14 and removing outer segments 16. The perimeter paths 14 in FIG. 2 substantially form a square, however, it can be appreciated that ground cover 10 can have as many perimeter paths 14 as necessary to accommodate a variety of possible multi-sided geometric shapes of varying sizes. Alternatively to the circular ground cover design shown in FIG. 2, ground cover 10 can be manufactured in a square design and provided with circular perimeter paths so that corner flanges of the square design can be selectively removed. In the preferred embodiment, circular ground cover 10 is 32 inches in diameter, with square, perimeter path sides of 24 inches.

Figure 3:
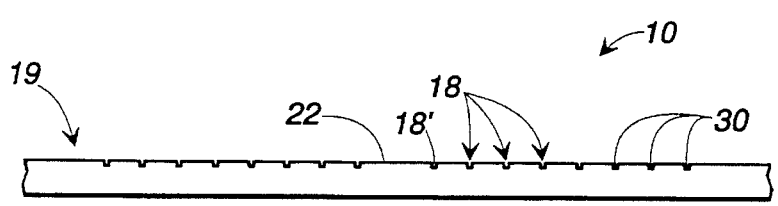
FIG. 3 is a partial sectional view taken along lines 3—3 of FIG. 2.

Paths 14, 18 and 28 are formed by channels 30, shown in FIG. 3, formed in the top surface of ground cover 10 and having side walls 14', 18' and 18'. Each channel 30 which defines a path is approximately ⅛ inches in width and approximately ⅛ inches in depth. Paths 14, 18 and 28 can take forms other than that illustrated herein. For instance, paths 14, 18 and 28 can comprise two parallel raised ribs defining a path therebetween, with opposed, inner side walls. Additionally, paths 14, 18 and 28 can be silkscreened on ground cover 10. Further, paths 14, 18 and 28 can also be formed along or in the bottom surface of ground cover 10.

A plurality of drainage holes are defined through ground cover 10 to allow moisture and air to pass through ground cover 10 to the root system of the tree or shrub. Drainage holes 32 are equally spaced and disposed along two orthogonal reference lines 31 which intersect at center 22. Each drainage hole 32 in the preferred embodiment is ⅛ inches in diameter. An alternative to providing drainage holes 32 is to construct ground cover 10 out of a porous composite of rubber filings which would allow water and air to pass but prevent the growth of grass or weeds. Such composite material is commonly used to surface running tracks or play grounds.

In use, ground cover 10 is a light weight flexible ground cover which is easily customized to both accommodate objects of varying size and to accommodate a variety of landscaping arrangements. To install ground cover 10 around a tree, shrub or post, the user must first size the diameter of the tree, shrub or post about which the ground cover 10 is to be used. Knowing the diameter, the user then cuts along radial path 28 to the appropriate circular path 18 corresponding to the measured diameter. The user then cuts along the path 18 in a circular fashion following the path until a disposable central portion is cut away, forming a central opening in ground cover 10. It should be noted that because of ground cover's 10 relatively small thickness a variety of common household devices may be used in cutting ground cover 10, such as scissors, utility knives, pocket knives, or any other similar cutting device. The indented paths serve as guides for these tools, ensuring that there is less chance the user will accidently cut away desirable sections of cover 10. Once customized to fit a particular tree, shrub or post, ground cover 10 can easily be put in place by the user.

In preparing ground cover 10 for use, the user can further customize ground cover 10 by cutting along perimeter paths 14 to selectively remove segments 16 so that ground cover 10 can fit a corner arrangement in the landscaping or a square opening in a sidewalk or patio. Ground cover 10 can be further customized for situations where trees, shrubs or posts are placed adjacent to one another such that circular ground covers would not overlap in an undesirable manner. In such a situation, opposing segments 16 of ground cover 10 can be removed so that the edges of adjacent ground covers are essentially flush. The remaining segments 16 can be left in tack or removed so as to create the desired visual effect.

Once all of the alterations have been made to ground cover 10, it may easily be placed around the tree or shrub by passing the trunk of the tree or shrub through the slit cut along radial path 28 until the tree trunk is disposed in the central opening formed by the removal of the central portion defined by a circular path 18. In place, ground cover 10 fits snugly to the ground and does not require securing means or fastening means as do many of the prior art ground covers. However, virtually any device shown in the prior art for securing ground cover can be utilized in conjunction with the present invention to further secure ground cover 10 to the ground.

It will be obvious to one of ordinary skill in the art that many modifications and variations can be made to the preferred embodiment described above without departing from the novel teachings of the present invention. As such modifications and variations are intended to be incorporated herein and within the scope of the following claims.

Wherefore the following is claimed by the inventor:

1. A landscaping ground cover for positioning around an object extending upwardly from the ground, comprising:

a flexible sheet having an upper surface, a lower surface, a center and a circular perimeter;

a plurality of spaced, concentric circular first paths defined along said upper surface, said first paths being channels and serving as guides so that said sheet can be selectively cut to create a central opening;

a second path defined along said upper surface and extending radially from substantially said center of said sheet to said perimeter for serving as a guide so that said sheet can be selectively cut to create a radial slit enabling said sheet to be placed around said object so that said object is received within said central opening; and at least a third non-circular path adjacent said circular perimeter for serving as a perimeter guide so that said sheet can be selectively cut to alter the perimeteral shape of said sheet.

2. The landscaping ground cover of claim 1, said sheet further defining a plurality of drainage holes therethrough, said holes located within said concentric circular first paths.

3. The landscaping ground cover of claim 1 further including reference means adjacent each of said concentric circular first paths for identifying each of said concentric circular first paths.

4. The landscaping ground cover of claim 1, said upper surface being textured to resemble ornamental particulate material.

5. The landscaping ground cover of claim 1, and said ground cover being comprised of vinyl.

6. The landscaping ground cover of claim 1, said sheet being of substantially uniform thickness.

7. A landscaping ground cover, comprising:

a circular sheet of flexible material having uniform thickness, said sheet including a perimeter, a center and a first surface;

a plurality of concentric circular channels formed in said first surface of said sheet, said concentric circular channels substantially centered about said center of said sheet;

a radial channel formed in said first surface of said sheet and radially extending from an innermost of said concentric circular channels to said perimeter of said sheet; and at least one non-circular perimeter channel formed in said first surface, and serving as a guide to cut along and alter the circular perimeteral shape of said sheet.

* * * * *